United States Patent
Simpkins et al.

(10) Patent No.: US 9,571,878 B2
(45) Date of Patent: *Feb. 14, 2017

(54) 3D POINTING DEVICE WITH UP-DOWN-LEFT-RIGHT MODE SWITCHING AND INTEGRATED SWIPE DETECTOR

(71) Applicant: Hillcrest Laboratories, Inc., Rockville, MD (US)

(72) Inventors: Daniel S. Simpkins, Bethesda, MD (US); Joseph Tanen, Columbia, MD (US)

(73) Assignee: HILLCREST LABORATORIES, INC., Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/541,815

(22) Filed: Nov. 14, 2014

(65) Prior Publication Data

US 2015/0070590 A1    Mar. 12, 2015

Related U.S. Application Data

(63) Continuation of application No. 13/628,505, filed on Sep. 27, 2012, now Pat. No. 8,907,892, which is a
(Continued)

(51) Int. Cl.
*G09G 5/00* (2006.01)
*H04N 21/422* (2011.01)
(Continued)

(52) U.S. Cl.
CPC ........ *H04N 21/42206* (2013.01); *G06F 3/017* (2013.01); *G06F 3/0304* (2013.01);
(Continued)

(58) Field of Classification Search
CPC .... G06F 3/0346; G06F 3/03547; G06F 3/038; G06F 3/0304; G06F 3/04815; G06F 3/011; G06F 3/0213; G06F 3/044; G06F 3/0488; G06F 3/0485; G06F 3/04842; G06F 3/042; G06F 2203/04101; G06F 3/005; G06F 3/017; G06F 3/0481; G06F 3/0354; G06F 3/04883; G06F 3/0482; G06F 3/0412; G06F 3/041; G06F 2203/04808; G06F 2203/04806; G06F 2203/04108; G06F 3/033; G06F 3/0383
(Continued)

(56) References Cited

U.S. PATENT DOCUMENTS 6,466,831 B1    10/2002   Shibata et al.
6,724,366 B2     4/2004   Crawford
(Continued)

FOREIGN PATENT DOCUMENTS

CN    1487703        4/2004
JP    2005-243021 A  9/2005
(Continued)

OTHER PUBLICATIONS

International Search Report in corresponding International Application No. PCT/US2011/061667 mailed Aug. 1, 2012.
(Continued)

*Primary Examiner* — Duc Dinh
(74) *Attorney, Agent, or Firm* — Patent Portfolio Builders PLLC

(57) ABSTRACT

A 3D pointing device for use with a content delivery system is provided. The pointing device can operate in one of at least one of two modes: a first 3D or scrolling mode, and a second non-3D mode that can also be referred to as an up-down-left-right (UDLR) mode. The pointing device can include one or more directional sensors, to provide orientation and movement information. For either of the at least two modes, an optical finger navigation module is provided that
(Continued)

can detect movement of a user's finger or object across its screen, and provides a predetermined threshold that must be exceeded before movement information is generated from the OFN module. The pointing device can generate scroll and UDLR commands based on the information from the orientation and movement sensors, as well as the OFN module, or can provide the information from the orientation and movement sensors to a user interface that can generate the appropriate scrolling or UDLR commands for use by the content delivery system.

19 Claims, 15 Drawing Sheets

Related U.S. Application Data continuation of application No. PCT/US2011/061667, filed on Nov. 21, 2011.

(60) Provisional application No. 61/427,562, filed on Dec. 28, 2010, provisional application No. 61/416,025, filed on Nov. 22, 2010.

(51) Int. Cl.
| | | |
|---|---|---|
| *G06F 3/03* | (2006.01) | |
| *G06F 3/038* | (2013.01) | |
| *H04N 5/44* | (2011.01) | |
| *G06F 3/0346* | (2013.01) | |
| *G06F 3/0354* | (2013.01) | |
| *G06F 3/01* | (2006.01) | |
| *G06F 3/0488* | (2013.01) | |
| *G06F 3/0484* | (2013.01) | |
| *G06F 3/0485* | (2013.01) | |

(52) U.S. Cl.
CPC .......... *G06F 3/038* (2013.01); *G06F 3/0346* (2013.01); *G06F 3/03547* (2013.01); *G06F 3/0485* (2013.01); *G06F 3/04842* (2013.01); *G06F 3/04883* (2013.01); *H04N 5/4403* (2013.01); *H04N 21/42222* (2013.01); *H04N 21/42224* (2013.01)

(58) Field of Classification Search
USPC ...................... 345/173–175, 169; 348/14.05
See application file for complete search history.

(56) References Cited

U.S. PATENT DOCUMENTS

| | | | |
|---|---|---|---|
| 6,876,312 B2 | 4/2005 | Yu | |
| 7,158,118 B2 | 1/2007 | Liberty | |
| 7,233,316 B2* | 6/2007 | Smith et al. | 345/157 |
| 7,474,772 B2* | 1/2009 | Russo et al. | 382/124 |
| 7,746,324 B2* | 6/2010 | Gates et al. | 345/169 |
| 7,859,517 B2 | 12/2010 | Zeng et al. | |
| 7,916,120 B2* | 3/2011 | Tiphane et al. | 345/156 |
| 8,314,773 B2* | 11/2012 | Low et al. | 345/166 |
| 2004/0268393 A1 | 12/2004 | Hunleth et al. | |
| 2006/0026521 A1 | 2/2006 | Hotelling et al. | |
| 2006/0262116 A1 | 11/2006 | Moshiri et al. | |
| 2007/0035518 A1 | 2/2007 | Francz et al. | |
| 2007/0236470 A1* | 10/2007 | Abanami | G06F 3/03547 345/173 |
| 2007/0236472 A1* | 10/2007 | Bentsen et al. | 345/173 |
| 2009/0033807 A1 | 2/2009 | Sheng et al. | |
| 2009/0153389 A1 | 6/2009 | Kerr et al. | |
| 2009/0201594 A1 | 8/2009 | Smith | |
| 2011/0148762 A1 | 6/2011 | Hatambeiki et al. | |

FOREIGN PATENT DOCUMENTS

| | | |
|---|---|---|
| KR | 10-2009-0065040 A | 6/2009 |
| KR | 10-2009-0119062 A | 11/2009 |
| WO | 2006/062789 A2 | 6/2006 |
| WO | 2010/002997 A1 | 1/2010 |

OTHER PUBLICATIONS

Written Opinion of the International Searching Authority in corresponding International Application No. PCT/US2011/061667 mailed Aug. 1, 2012.
Extended European Search Report in corresponding European Application No. 11843994.2—1908/2643743 dated May 15, 2014.
Office Action in corresponding Chinese Application No. 201180064937.X dated Nov. 4, 2015. (Cited references all submitted in Information Disclosure Statement filed Nov. 14, 2014. US2008/150898A1 also published as U.S. Patent No. 8,314,773 and CN1856054A also published as U.S. Patent No. 7,233,316).
Office Action in corresponding Chinese Application No. 201110369736.2 dated Nov. 3, 2015.
Office Action in corresponding Chinese Application No. 201180064937.X dated Jun. 24, 2016.

* cited by examiner

3D POINTING DEVICE WITH UP-DOWN-LEFT-RIGHT MODE SWITCHING AND INTEGRATED SWIPE DETECTOR

RELATED APPLICATIONS

This application is a continuation of U.S. patent application Ser. No. 13/628,505, filed on Sep. 27, 2012, entitled "3D POINTING DEVICE WITH UP-DOWN-LEFT-RIGHT MODE SWITCHING AND INTEGRATED SWIPE DETECTOR", which is a continuation of International Application No. PCT/US2011/061667, filed Dec. 28, 2010, which is related to, and claims priority from, U.S. Provisional Patent Application Ser. No. 61/427,562, also entitled "3D POINTING DEVICE WITH UP-DOWN-LEFT-RIGHT MODE SWITCHING" to Daniel S. Simpkins and Joseph Tanen, filed on Dec. 28, 2010, and U.S. Provisional Patent Application Ser. No. 61/416,025, entitled "UP-DOWN-LEFT-RIGHT MODE SWITCHING" to Daniel S. Simpkins, filed on Nov. 22, 2010, the disclosure of both of which are incorporated herein by reference.

BACKGROUND

The present invention describes mode switching techniques, devices, systems and software which can be used in three dimensional (3D) pointing devices, as well as in other types of devices.

Technologies associated with the communication of information have evolved rapidly over the last several decades. Television, cellular telephony, the Internet and optical communication techniques (to name just a few modes of communications) combine to inundate consumers with available information and entertainment options. Taking television as an example, the last three decades have seen the introduction of cable television service, satellite television service, pay-per-view movies and video-on-demand, both of the latter being made available by cable, fiber-optic, and satellite service providers, as well as over the internet (e.g., Netflix®). Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counter-weighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide that was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the television-user interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides, and their displayed counterparts on a guide channel, are still the most prevalent mechanism for conveying programming information. The multiple button remote control 100, an example of which is illustrated in FIG. 1 with up 102, down 104, left 106 and right 108 arrows, is still the most prevalent channel/content navigation mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling. However, this approach has significantly increased both the time required for a viewer to review the available information and the complexity of actions required to implement a selection. For example, in a large grid guide supporting hundreds of channels, a user may have to perform 50 or a 100 up-down-left-right button presses to navigate the grid guide and make a content selection. Arguably, the cumbersome nature of the existing interface has hampered commercial implementation of some services, e.g., video-on-demand, since consumers are resistant to new services that will add complexity to an interface that they view as already too slow and complex.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection process even more tedious by forcing the user to repeatedly depress the up and down buttons to navigate the list or hierarchies. When selection skipping controls are available such as page-up and page-down, the user usually has to look at the remote to find these special buttons or be trained to know that they even exist. Accordingly, organizing frameworks, techniques and systems that simplify the control and screen interface between users and media systems as well as accelerate the selection process, while at the same time permitting service providers to take advantage of the increases in available bandwidth to end user equipment by facilitating the supply of a large number of media items and new services to the user have been proposed in the Assignee's earlier U.S. patent application Ser. No. 10/768, 432, filed on Jan. 30, 2004, entitled "A Control Framework with a Zoomable Graphical User Interface for Organizing, Selecting and Launching Media Items", the disclosure of which is incorporated here by reference.

Of particular interest for this specification are the remote devices usable to interact with such frameworks, as well as other applications and systems. As mentioned in the above-incorporated application, various different types of remote devices can be used with such frameworks including, for example, trackballs, "mouse"-type pointing devices, light pens, etc. However, another category of remote devices which can be used with such frameworks (and other applications) is 3D pointing devices. The phrase "3D pointing" is used in this specification to refer to the ability of an input device to move in three (or more) dimensions in the air in front of, e.g., a display screen, and the corresponding ability of the user interface to translate those motions directly into user interface commands, e.g., movement of a cursor on the display screen. The transfer of data between the 3D pointing device may be performed wirelessly or via a wire connecting the 3D pointing device to another device. Thus "3D pointing" differs from, e.g., conventional computer mouse pointing techniques which use a surface, e.g., a desk surface or mouse pad, as a proxy surface from which relative movement of the mouse is translated into cursor movement on the computer display screen. An example of a 3D pointing device can be found in Assignee's U.S. Pat. No. 7,158,118 to Matthew G. Liberty (hereafter referred to as the '118 patent), the disclosure of which is incorporated here by reference.

The '118 patent describes 3D pointing devices which include, for example, one or more rotational sensors and an accelerometer. The rotational sensor(s) are used, as described in more detail below, to detect an angular rate at which the 3D pointing device is being rotated by a user, and this information is conveyed to a user interface wherein it can be used, for example, to control cursor movement. Such 3D pointing devices have been shown to free the user from the constraints of up-down-left-right (UDLR) remote control devices 100 by, for example, allowing them to directly, quickly and randomly access any point or region on a displayed user interface or screen.

However, despite the established benefits of 3D pointing, an issue that may be presented with this new technology is how to handle legacy applications or systems that expect UDLR inputs to select user interface objects, e.g., media selections on a television. Even though 3D pointing provides a superior user experience in many respects, given the large number of devices and applications that have been designed to expect UDLR inputs, 3D pointing (by itself) may not provide sufficient support for such legacy systems. Of perhaps more significant importance, however, is that code bases for set top boxes (STB) and television operation, for example, are so large that a substantial transition period needs to planned for wherein legacy (UDLR) style navigation has to co-exist with the newer 3D pointing style navigation. A new device (i.e., a new 3D pointer) that implements both forms of control into one device and that can change mode of control between different applications, or even different screens, without compromising performance of either type would provide an easy, elegant and simple transition path from the legacy UDLR-type navigation to pointing-type navigation.

SUMMARY OF THE INVENTION

It is therefore a general aspect of the invention to provide a 3d pointer device that will obviate or minimize problems of the type previously described.

According to a first aspect of the present invention, a method for generating either a scroll command or an up-down-left-right (UDLR) command using a single control element of a remote control device is provided, the method comprising detecting movement of an object across a surface of said single control element of said remote control device, determining a direction of said detected movement and a distance of said detected movement in said direction, generating, when in a scroll mode, a scroll command based upon said direction and distance of said detected movement; and generating, when in a UDLR mode, a UDLR command when said distance exceeds a predetermined distance threshold in said direction.

According to a second aspect of the present invention, a method for generating either a scroll command or an up-down-left-right (UDLR) command using a single control element of a remote control device is provided, the method comprising detecting movement of an object across a surface of said single control element of said remote control device, generating, when in a scroll mode, a scroll command responsive to said detected movement, and generating, when in an UDLR mode, an UDLR command.

According to a third aspect of the present invention, a method for generating either a scroll command or an up-down-left-right (UDLR) command using a single control element of a remote control device is provided, the method comprising receiving data from said single control element which indicates motion of an object in one of a plurality of different directions; and generating either said scroll command or said UDLR command based upon said received data and a mode of operation of said remote control device.

According to a fourth aspect of the present invention, a remote control device is provided comprising a housing, at least one sensor, disposed at least partially within said housing, said at least one sensor configured to detect motion of said remote control device and to generate first data associated with said detected motion, an optical finger navigation (OFN) module, disposed on an upper surface of said housing, configured to detect movement of an object across a surface of a lens and to generate second data associated with said detected movement, a user input control element configured to switch said remote control device from a 3D pointing mode into a non-3D pointing mode, and a processor configured to receive said first data and said second data and further configured to operate, when in said 3D pointing mode, to transmit information associated with said first data and to transmit a scroll command based on said second data, and further configured to operate, when in said non-3D pointing mode, to transmit an up-down-left-right (UDLR) command based on said second data.

According to a fifth aspect of the present invention, a remote control device is provided comprising an optical finger navigation (OFN) module configured to detect movement of an object across a surface of said OFN module and to generate data associated with said detected movement, and a processor configured to receive said data and to transmit a command based on said data, wherein said processor is configured to operate either in a scroll mode or an up-down-left-right (UDLR) mode such that when in said scroll mode said processor generates a scroll command based on said data and when in said UDLR mode said processor generates a UDLR command based on said data.

According to a sixth aspect of the present invention, a system is provided, comprising a user interface controlling device configured to generate and control a user interface based, at least in part, on received user inputs, wherein said user interface controlling device is further configured to receive an input which, in a first mode, is interpreted as a scroll command and which, in a second mode, is interpreted as an up-down-left-right (UDLR) command.

According to a seventh aspect of the present invention, a system for controlling operation of a content providing apparatus is provided, comprising a remote control device, the remote control device including a housing, at least two sensors, disposed at least partially within said housing, said first of the at least two sensors configured to detect motion of said remote control device in a first plane of motion, and to generate first data associated with said detected motion in the first plane of motion, and wherein said second of the at least two sensors is configured to detect motion of said remote control device in a second plane or motion, and to generate second data associated with said detected motion in the second plane of motion, an optical finger navigation (OFN) module, disposed on a first surface of said housing, configured to detect movement of an object across a surface of a lens and to generate third data associated with said detected movement, and further wherein the detected motion includes information about a direction of the detected motion, and still further wherein the detected motion includes information about the detected motion exceeding a predetermined threshold, a user input control element configured to switch said remote control device from a 3D pointing mode into a non-3D pointing mode, and a processor configured to receive said first data, said second data, and said third data, and is further configured to operate, when in said 3D pointing mode, to transmit 3D pointing information associated with said first and second data, and further configured to operate, when in said non-3D pointing mode, to transmit UDLR information associated with said third data; and wherein the system further includes a user interface controlling device configured to generate and control a user interface based, at least in part, on received user inputs, wherein said user interface controlling device is further configured to receive said 3D pointing information from the remote control device that is interpreted as a scroll command, and which is further configured to receive said non-3d pointing information from the remote control device that is interpreted as an up-down-left-right (UDLR) command.

According to an eighth aspect of the present invention, a method for controlling a user interface that interfaces with a remote control device is provided, comprising determining, by the user interface, whether the remote control device should be operating in a first mode or a second mode, forwarding, by the user interface, a control signal to the remote control device to put the remote control device in either the first operating mode or the second operating mode, and receiving, by the user interface, either a scroll command that corresponds to the first operating mode, or an up-down-left-right (UDLR) command that corresponds to the second operating mode.

According to a ninth aspect of the present invention, a method for controlling a user interface using a 3D pointing device is provided, comprising, switching an operating mode of the 3D pointing device between a random access mode and a non-random access mode.

According to a tenth aspect of the present invention, a system that includes a 3D pointing device is provided, comprising a processor configured to switch an operating mode of the 3D pointing device between a random access mode and a non-random access mode.

BRIEF DESCRIPTION OF THE DRAWINGS

The accompanying drawings illustrate exemplary embodiments, wherein.

DETAILED DESCRIPTION

Figure 1:
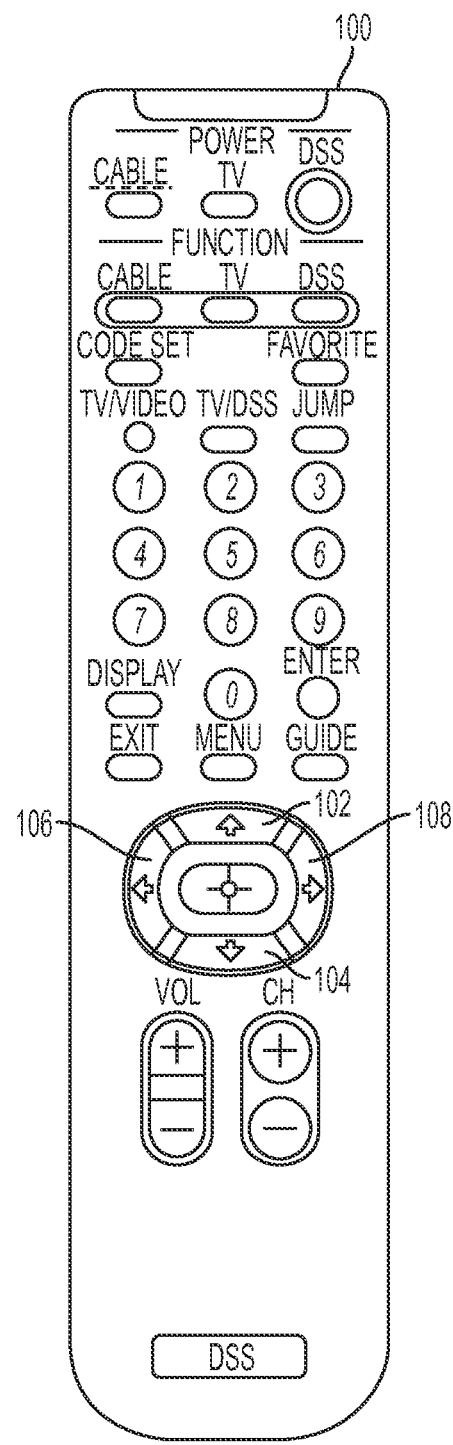
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television (TV)/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device according to one of the exemplary embodiments described below. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
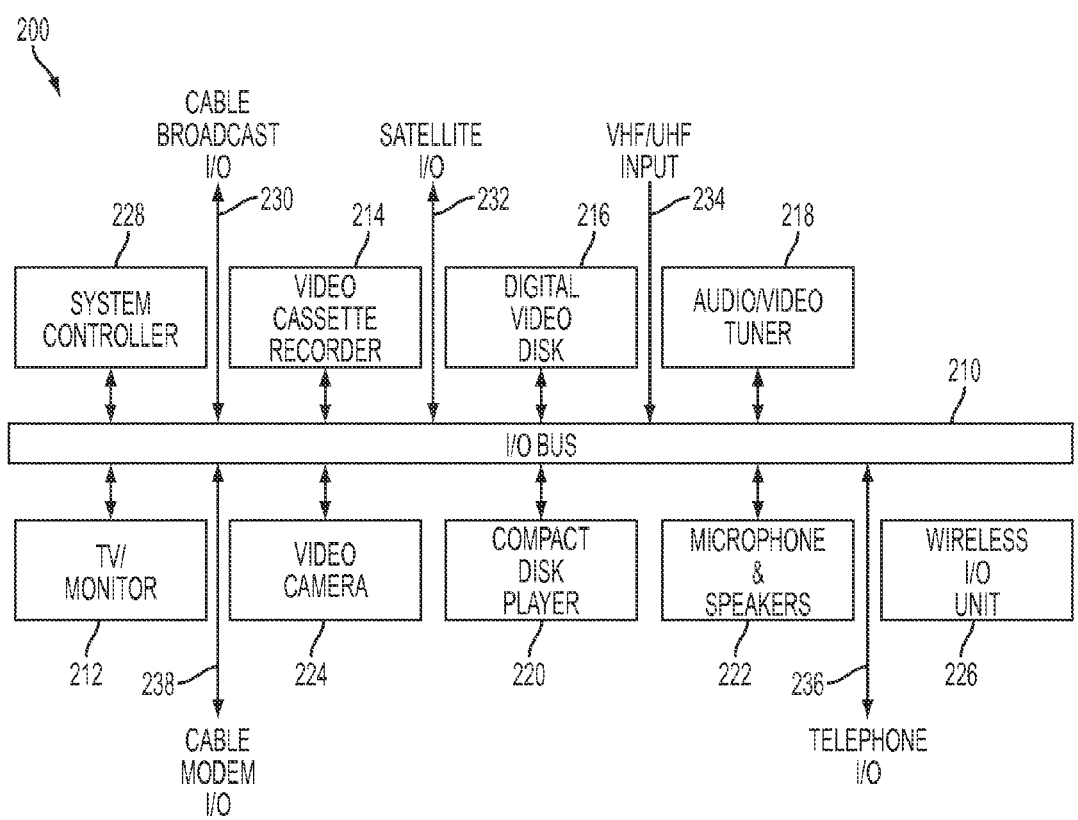
FIG. 2 depicts an exemplary media system in which exemplary embodiments can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230 (e.g., via coaxial cable, or optionally a fiber optic cable), satellite broadcast 232 (e.g., via a satellite dish), very high frequency (VHF) or ultra-high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. Patent Application Publication No. 2004/0268393, entitled "A Control Framework with a Zoomable Graphical User Interface for Organizing, Selecting and Launching Media Items". Alternatively, remote devices in accordance with the present invention can be used in conjunction with other systems, for example computer systems including, e.g., a display, a processor and a memory system or with various other systems and applications.

Figure 3:
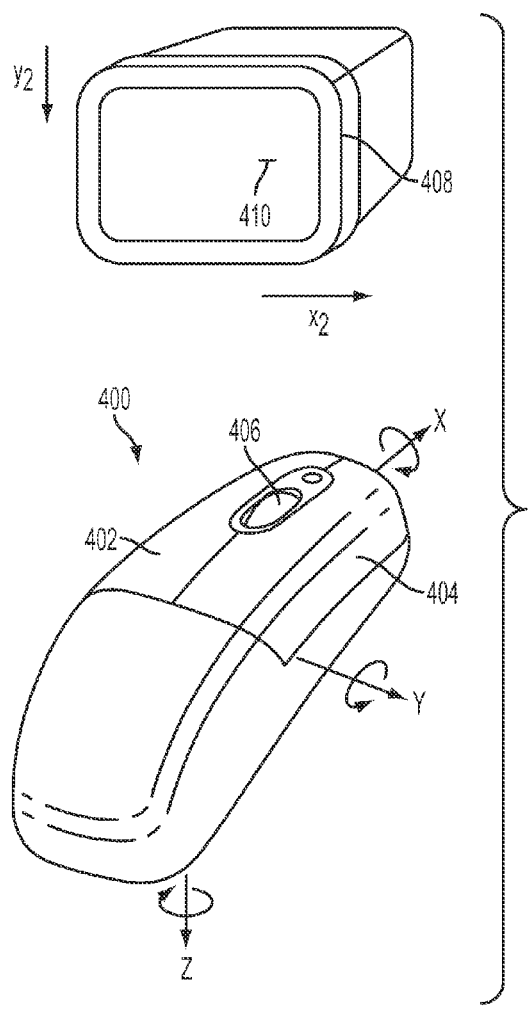
FIG. 3 shows a 3D pointing device according to an exemplary embodiment of the present invention.

As mentioned in the Background section, remote devices which operate as 3D pointers are of particular interest for the present specification. Such devices enable the translation of movement, e.g., gestures, into commands to a user interface. An exemplary 3D pointing device 400 is depicted in FIG. 3. Therein, user movement of the 3D pointing can be defined, for example, in terms of a combination of x-axis attitude (roll), y-axis elevation (pitch) and/or z-axis heading (yaw) motion of the 3D pointing device 400. In addition, some exemplary embodiments of the present invention can also measure linear movement of the 3D pointing device 400 along the x, y, and z axes to generate cursor movement or other user interface commands. In the exemplary embodiment of FIG. 3, the 3D pointing device 400 includes two buttons 402 and 404 as well as a scroll wheel 406, although other exemplary embodiments will include other physical configurations as will be specifically described under the heading "Up-Down-Left-Right Mode Switching" below.

According to exemplary embodiments of the present invention, it is anticipated that 3D pointing devices 400 will be held by a user in front of a display 408 and that motion of the 3D pointing device 400 will be translated by the 3D pointing device into output which is usable to interact with the information displayed on display 408, e.g., to move the cursor 410 on the display 408. For example, rotation of the 3D pointing device 400 about the y-axis can be sensed by the 3D pointing device 400 and translated into an output usable by the system to move cursor 410 along the $y_2$ axis of the display 408. Likewise, rotation of the 3D pointing device 408 about the z-axis can be sensed by the 3D pointing device 400 and translated into an output usable by the system to move cursor 410 along the $x_2$ axis of the display 408. It will be appreciated that the output of 3D pointing device 400 can be used to interact with the display 408 in a number of ways other than (or in addition to) cursor movement, for example it can control cursor fading, volume or media transport (play, pause, fast-forward and rewind). Input commands may include operations in addition to cursor movement, for example, a zoom in or zoom out on a particular region of a display. A cursor may or may not be visible. Similarly, rotation of the 3D pointing device 400 sensed about the x-axis of 3D pointing device 400 can be used in addition to, or as an alternative to, y-axis and/or z-axis rotation to provide input to a user interface.

Figure 4:
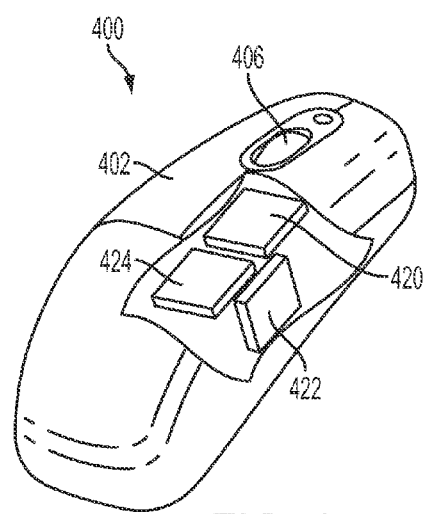
FIG. 4 illustrates a cutaway view of the 3D pointing device in FIG. 4 including two rotational sensors and one accelerometer.

According to one purely illustrative exemplary embodiment of the present invention, two rotational sensors 420 and 422 and one accelerometer 424 can be employed as sensors in 3D pointing device 400 as shown in FIG. 4. Although this exemplary embodiment employs inertial sensors to sense motion it will be appreciated that the present invention is not so limited and examples of other types of sensors which can be used in conjunction with other exemplary embodiments are provided below. The rotational sensors 420 and 422 can, for example, be implemented using ADXRS150 or ADXRS401 sensors made by Analog Devices. It will be appreciated by those skilled in the art that other types of rotational sensors can be employed as rotational sensors 420 and 422 and that the ADXRS150 and ADXRS401 are purely used as an illustrative example.

Unlike traditional gyroscopes, these exemplary rotational sensors use micro electromechanical systems (MEMS) technology to provide a resonating mass which is attached to a frame so that it can resonate only along one direction. The resonating mass is displaced when the body to which the sensor is affixed is rotated around the sensor's sensing axis. This displacement can be measured using the Coriolis acceleration effect to determine an angular velocity associated with rotation along the sensing axis. If the rotational sensors 420 and 422 have a single sensing axis (as for example the ADXRS150s), then they can be mounted in the 3D pointing device 400 such that their sensing axes are aligned with the rotations to be measured. For this exemplary embodiment of the present invention, this means that rotational sensor 422 is mounted such that its sensing axis is parallel to the y-axis and that rotational sensor 420 is mounted such that its sensing axis is parallel to the z-axis as shown in FIG. 4.

It will be appreciated that different sensor packages may be available which could lead to other exemplary implementations. For example, the two 1-D rotational sensors 420 and 422 could be replaced by a single, 2D rotational sensor package which provides outputs of rotational motion along, e.g., the y and z axes. One exemplary 2-D rotational sensor is the InvenSense IDG-300, although it will be appreciated that other sensors/sensor packages may also be used. The rotational sensors 420, 422 can be 1-D, 2-D or 3-D sensors. The accelerometer 424 can, for example, be a 3-axis linear accelerometer, although a 2-axis linear accelerometer could be used by assuming that the device is measuring gravity and mathematically computing the remaining $3^{rd}$ value. Additionally, the accelerometer(s) and rotational sensor(s) could be packaged together into a single sensor package. Other variations of sensors and sensor packages may also be used in conjunction with these exemplary embodiments.

Figure 5:
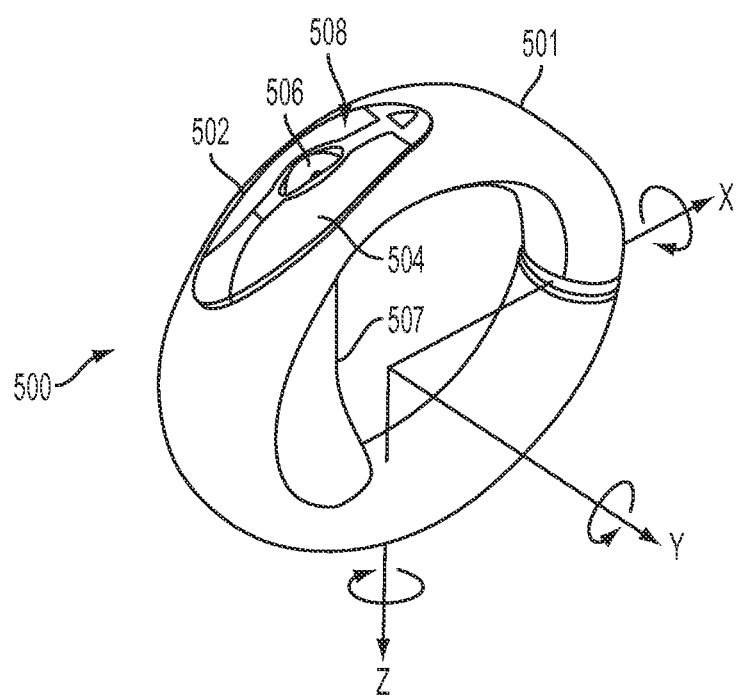
FIG. 5 shows a 3D pointing device according to another exemplary embodiment.

The exemplary embodiments are not limited to the industrial design illustrated in FIGS. 3 and 4, but can instead be deployed in any industrial form factor, another example of which is illustrated as FIG. 5. In the exemplary embodiment of FIG. 5, the 3D pointing device 500 includes a ring-shaped housing 501, two buttons 502 and 504 as well as a scroll wheel 506 and grip 507, although other exemplary embodiments may include other physical configurations. The region 508 which includes the two buttons 502 and 504 and scroll wheel 506 is referred to herein as the "control area" 508, which is disposed on an outer portion of the ring-shaped housing 501. More details regarding this exemplary embodiment can be found in U.S. patent application Ser. No. 11/480,662, entitled "3D Pointing Devices", filed on Jul. 3, 2006, the disclosure of which is incorporated here by reference. As will be discussed in more detail below in the section related to UDLR mode switching, according to some exemplary embodiments, the scroll wheel 506 can be replaced by a different control element, e.g., an optical finger navigation (OFN) device.

Figure 6:
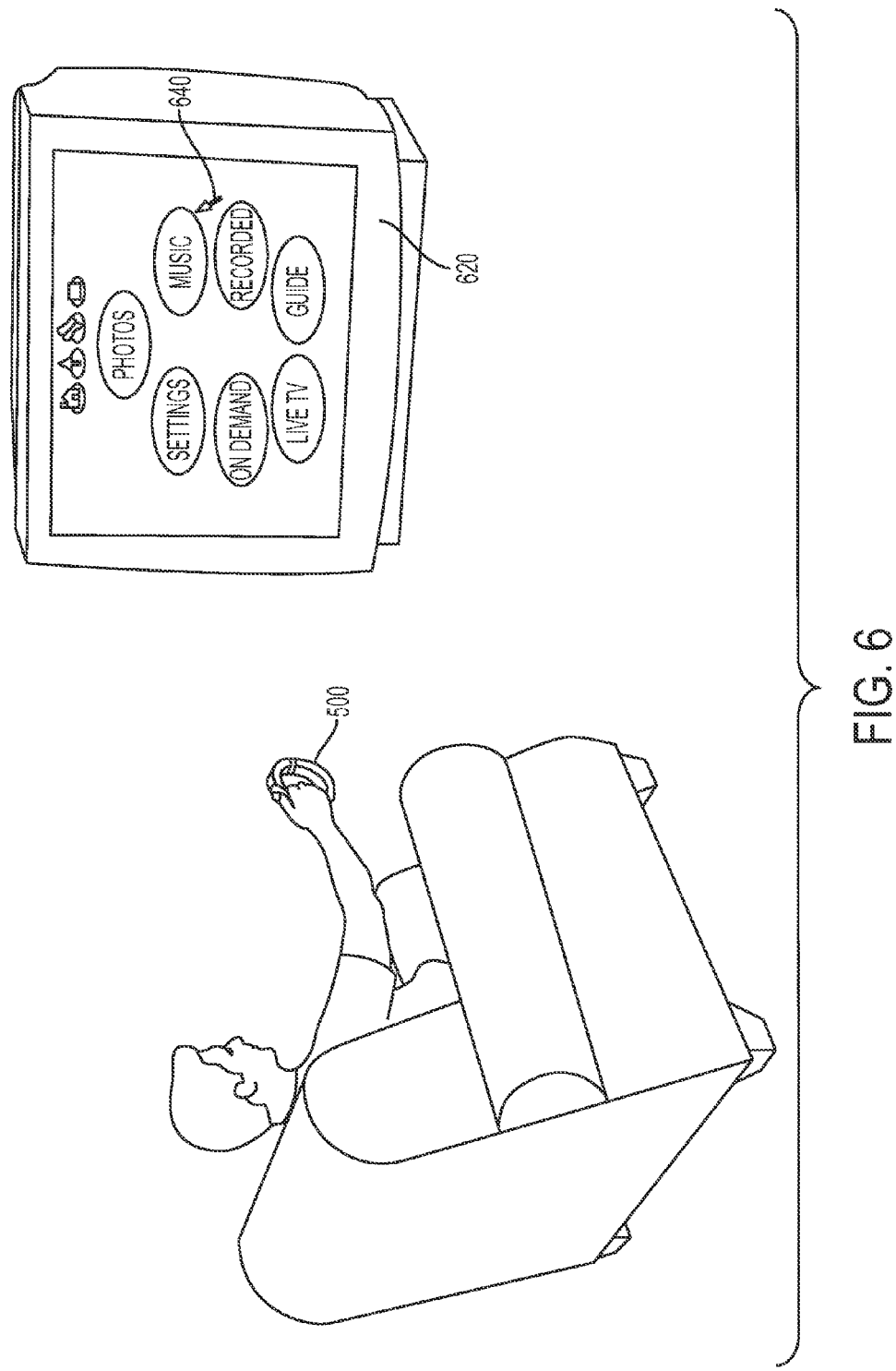
FIG. 6 depicts the 3D pointing device of FIG. 5 being used as part of a "10 foot" interface according to an exemplary embodiment.

Such 3D pointing devices have numerous applications including, for example, usage in the so-called "10 foot" interface between a sofa and a television in the typical living room as shown in FIG. 6. Therein, as the 3D pointing device 500 moves between different positions, that movement is detected by one or more sensors within 3D pointing device 500 and transmitted to the television 620 (or associated system component, e.g., a set-top box (not shown)). Movement of the 3D pointing device 500 can, for example, be translated into movement of a cursor 640 displayed on the television 620 and which is used to interact with a user interface. Details of an exemplary user interface with which the user can interact via 3D pointing device 500 can be found, for example, in the above-incorporated U.S. patent application Ser. No. 10/768,432 as well as U.S. patent application Ser. No. 11/437,215, entitled "Global Navigation Objects in User Interfaces", filed on May 19, 2006, the disclosure of which is incorporated here by reference.

One challenge faced in implementing exemplary 3D pointing devices 400, 500 in accordance with these exemplary embodiments is to employ components, e.g., rotational sensors 420 and 424, which are not too costly, while at the same time providing a high degree of correlation between movement of the 3D pointing devices 400, 500, a user's expectation regarding how the user interface will react to that particular movement of the 3D pointing device 400, 500 and actual user interface performance in response to that movement. For example, if the 3D pointing device 400 is not moving, the user will likely expect that the cursor ought not to be drifting across the screen. Likewise, if the user rotates the 3D pointing device 400 purely around the y-axis, she or he would likely not expect to see the resulting cursor movement on display 408 contain any significant x-axis component. To achieve these, and other, aspects of exemplary embodiments of the present invention, various measurements and calculations are performed, e.g., by the 3D pointing devices 400, 500, which are used to adjust the outputs of one or more of the sensors 420, 422 and 424 and/or as part of the input used by a processor to determine an appropriate output for the user interface based on the outputs of the sensors 420, 422 and 424. These measurements and calculations are used to compensate for factors which fall broadly into two categories: (1) factors which are intrinsic to the 3D pointing devices 400, 500, e.g., errors associated with the particular sensors 420, 422 and 424 used in the 3D pointing devices 400, 500 or the way in which the sensors are mounted in the 3D pointing devices 400, 500, and (2) factors which are not intrinsic to the 3D pointing devices 400, 500, but are instead associated with the manner in which a user is using the 3D pointing devices 400, 500, e.g., linear acceleration, tilt and tremor. Some exemplary techniques for handling these effects are described in the above-incorporated by reference '118 patent. Additional techniques, e.g., related to handling the bias or offset error contributions to sensed motion are described in Assignee's U.S. Patent Publication No. 2009/0033807, the disclosure of which is also incorporated here by reference.

Up-Down-Left-Right Mode Switching

Sometimes, it may also be desirable to provide legacy support in the 3D pointing devices described above (or others) for devices, applications and/or software which were designed to receive UDLR inputs as, for example, selection inputs to a user interface. Exemplary embodiments of the present invention address this desire by providing for mode switching in 3D pointing devices between a 3D pointing mode and an UDLR mode (or, expressed even more generally, between a random access mode and a non-random access mode), or a between a mode in which a particular control element on a 3D pointing device is operable in a UDLR mode and a non-UDLR mode, e.g., a scrolling mode.

According to one such exemplary embodiment, when a 3D pointing device is interacting with a user interface controlling device (e.g., a television, a set-top box, a gaming console, or any other such device), or an application running on the user interface controlling device, which supports 3D pointing inputs, then the system (i.e., the 3D pointing device and/or the user interface controlling device), operates in 3D pointing mode. On the other hand, when a 3D pointing device is interacting with a user interface controlling device (e.g., a television, a set-top box, a gaming console, or any other such device), or an application running on the user interface controlling device, which does not support 3D pointing inputs (or which does support or need UDLR inputs), then the system (i.e., the 3D pointing device and/or the user interface controlling device), operates in a non-3D pointing mode, e.g., an UDLR mode.

Such exemplary embodiments can be implemented in different ways. For example, according to one exemplary embodiment, the 3D pointing device can be modified to include a mode switching function. In this embodiment, after actuating a mode switching control (which can be an explicit button or other input on the 3D pointing device, or some less explicit control such as: (a) an UDLR gesture, which is a pattern of movement by the user holding the 3D pointing device that is recognized by the 3D pointing device as a command to enter UDLR mode; or (b) a series of non-UDLR gestures, which can be, by way of example only, a rocking motion of the hand, followed by a rolling motion), the 3D pointing device will interpret one or more subsequent inputs that it receives from a user (either by way of motion of the device, operation of a button or movement of the scroll wheel 506 in the exemplary 3D pointing device described above) as one of an up, down, left or right command and will transmit a corresponding UDLR signal or command toward the user interface controlling device. According to a further exemplary embodiment, even if a mode switch occurs, whether it's from a 3D pointing mode to an UDLR mode, or visa-versa, motions from the original mode can still be interpreted while in the new mode. For example, if the 3D pointing device was in a 3D pointing mode, and then transitioned to an UDLR mode, the 3D pointing device, while in the UDLR mode, can still interpret some or all of the set of 3D gestures.

According to another exemplary embodiment, the user interface controlling device, e.g., system controller 228 in FIG. 2, (or application running on the user interface controlling device) can interpret a specific input which it receives from the 3D pointing device as an up, down, left or right input command. In this exemplary embodiment, it may not be necessary to make any changes to the 3D pointing device itself, or to perform a mode switching in the 3D pointing device. That is, in this particular exemplary embodiment, determination of scroll versus UDLR mode is performed in the receiving device, i.e., in system controller 228. In another exemplary embodiment, the user interface (or application running on the user interface controlling device) itself effectuates the mode switch of the 3D pointing device between, for example, the UDLR and scrolling modes. In this case, the operational mode of the 3D pointing device is controlled by the user interface without any explicit action by the user to make said selection. The change between operational modes of the 3D pointing device can occur, for example, if the entire application or user interface operates in a different operating mode than the 3D pointing device is current to operate in, or, if one or more portions/sub-applications of the user interface operates in a different mode that what the 3D pointing device is currently set to operate in.

Figure 7A:
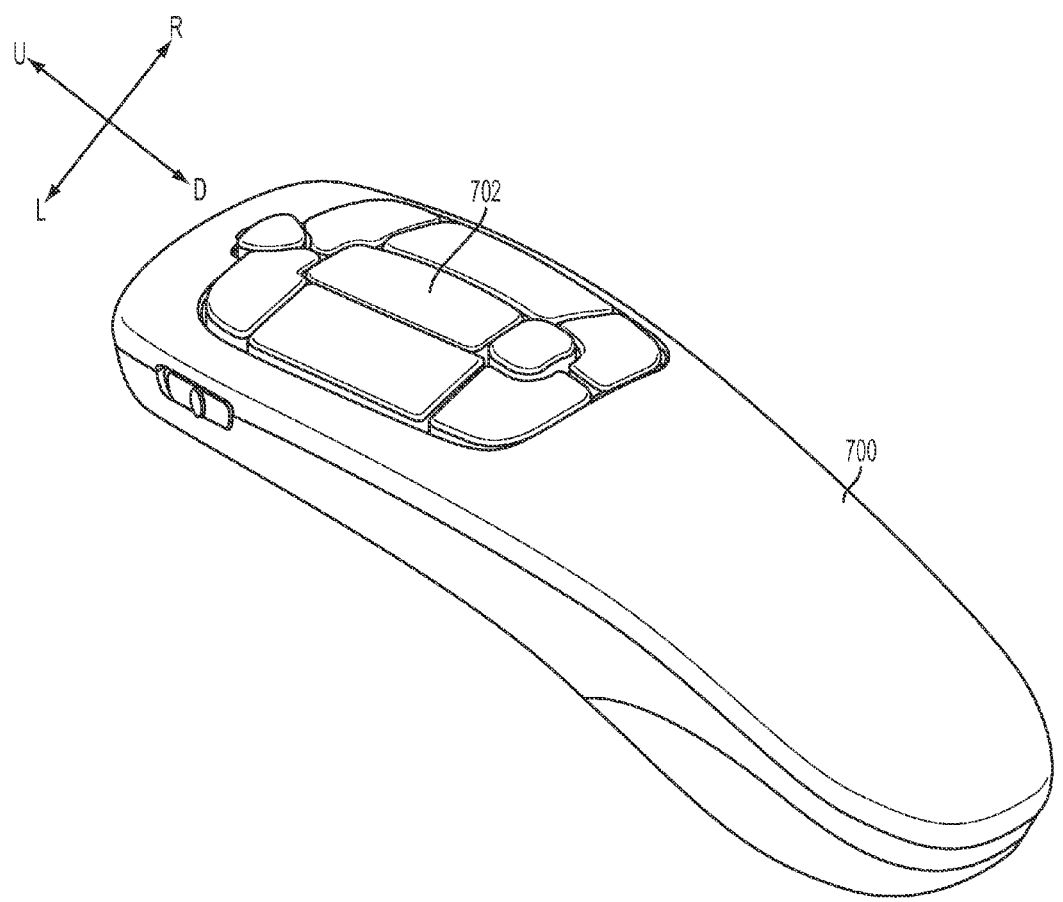
FIG. 7A depicts a 3D pointing device with a scroll/UDLR control element according to an exemplary embodiment.

To support these exemplary embodiments, it may be desirable (but not necessary) to adapt an input control on a 3D pointing device to support UDLR mode switching. For example, as shown in FIG. 7A, instead of the scroll wheel 506 provided to the 3D pointing device of FIG. 5, it may be desirable to provide a 3D pointing device 700 with an optical pad 702 which can detect the movement of, for example a user's thumb, across the optical pad 702 in any desired direction. An example of such an optical pad 702 is an optical finger navigation (OFN) device, such as any of those described in U.S. Patent Publication No. 20090201594, the disclosure of which is incorporated herein by reference. OFN devices, sometimes referred to as "air lenses", operate by illuminating an object, e.g., a finger or fingerprint, and tracking the object's motion across a surface. As the object moves across the surface, motion is detected based on differences between at least two images recorded by an image sensor over a relatively short period of time. According to some embodiments, movements of, e.g., a finger, across an optical pad or OFN device can be referred to as "swipe" or "swiping." For example, a left motion of a finger or object across an optical pad or OFN can be referred to as a "left swipe" and a right movement of the finger or object can be referred to as a "right swipe."

With this input control 702, when in 3D pointing mode (or, from the point of view of the control element 702, when in scrolling mode), an input received via the optical pad 702 can be considered to be, for example, a scrolling input. Thus either the 3D pointing device, the user interface controlling device, and/or an application running on the user interface controlling device will interpret an input received via the optical control pad 702 as a scrolling input and will scroll the user interface in the indicated direction when operating in 3D pointing mode or scroll mode. By way of contrast, when operating in UDLR mode, inputs received via optical control pad 702 are interpreted by one or more of the 3D pointing device 700, the user interface controlling device and/or an application running on the user interface controlling device as an up, down, left or right input command. As mentioned above, the selection of UDLR mode or non-UDLR mode for the 3D pointing device, user interface controlling device and/or application can be made, for example, explicitly by the user, or implicitly by the system based on e.g., the types of inputs that the application or user interface controlling device is designed to accept.

Figure 7B:
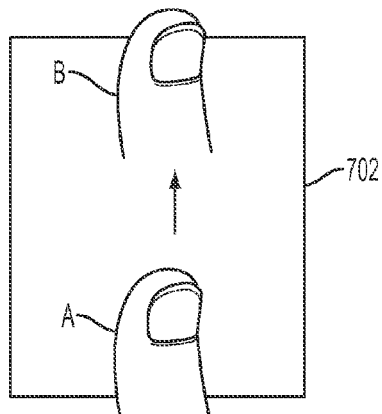
FIGS. 7B-E depict movement of a user's thumb in an up, down, left, right motion across an optical finger navigation device according to an exemplary embodiment.
Figure 7C:
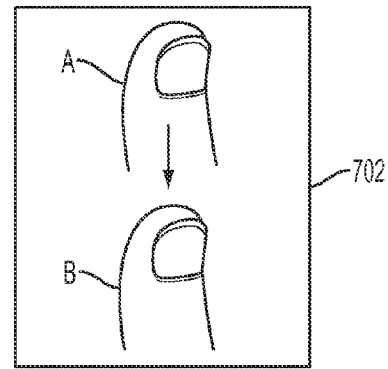
Figure 7D:
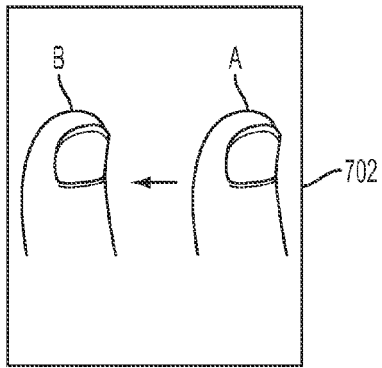
Figure 7E:
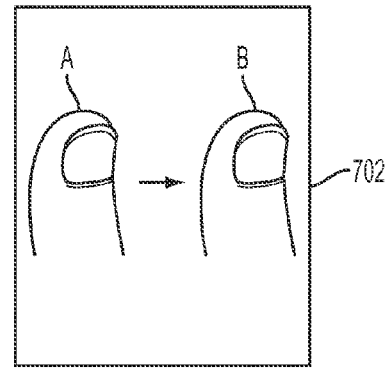

As a purely illustrative example, if a user moves his or her thumb across the optical control pad 702 from the bottom of the pad 702 toward the top of the pad 702, as shown in FIG. 7B (position A at bottom, position B at top), this input can be interpreted as a "scroll up" command when the system is operating in a 3D pointing or scrolling mode. By way of contrast when the system is operating in UDLR mode, e.g., due to the execution of an application on the user interface controlling device which only recognizes UDLR commands, or some mode switching command, then this same input by the user on optical control pad 702 can instead be interpreted as an "up" command and, for example, a highlighted region, cursor, or other focus effect could move up from one displayed interface element to the next "highest" interface element in an UDLR matrix of displayed elements in response to receipt of information generated based on this input. Correspondingly, as shown in FIGS. 7B-E, there is the scroll down (FIG. 7C), scroll left (FIG. 7D), and scroll right (FIG. 7E) commands. In all of FIGS. 7B-E, position A is the initial position, and position B is the final position. According to a further exemplary embodiment, each of FIGS. 7B-E can include an optical lens threshold (threshold) 703 (similar to that as discussed in greater detail below in regard to FIG. 12, and threshold 803), that would need to be crossed in order to interpret a scroll command (i.e., an upper threshold 803 needs to be crossed by the thumb for an upward scroll, a lower threshold 803 needs to be crossed by the thumb for a downward scroll, and similarly for left and right scrolls).

Figure 8:
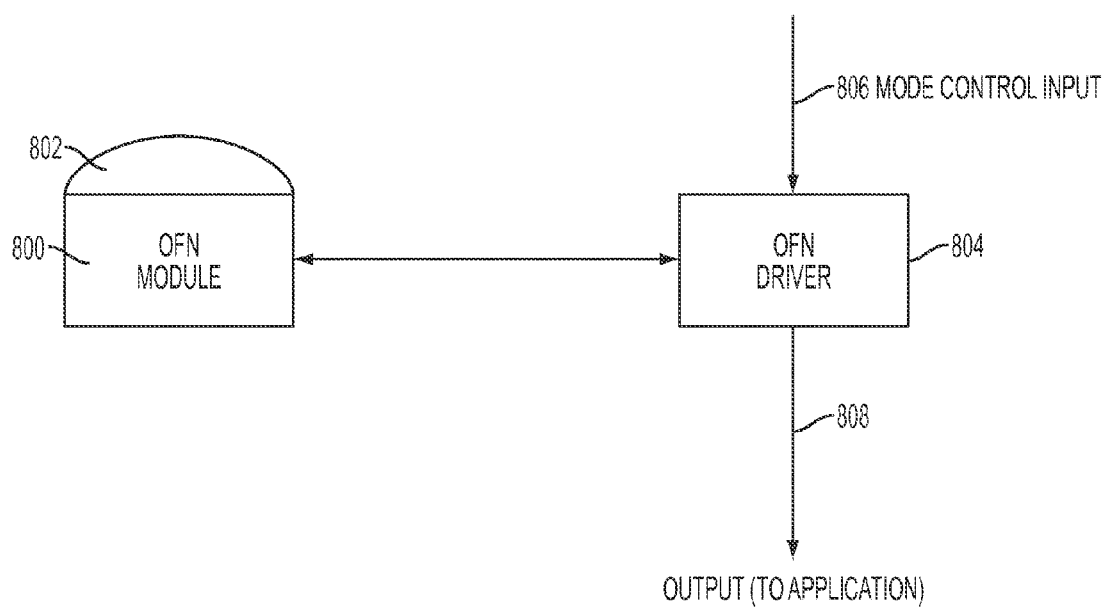
FIG. 8 shows elements of the 3D pointing device of FIG. 7 according to an exemplary embodiment.
Figure 13:
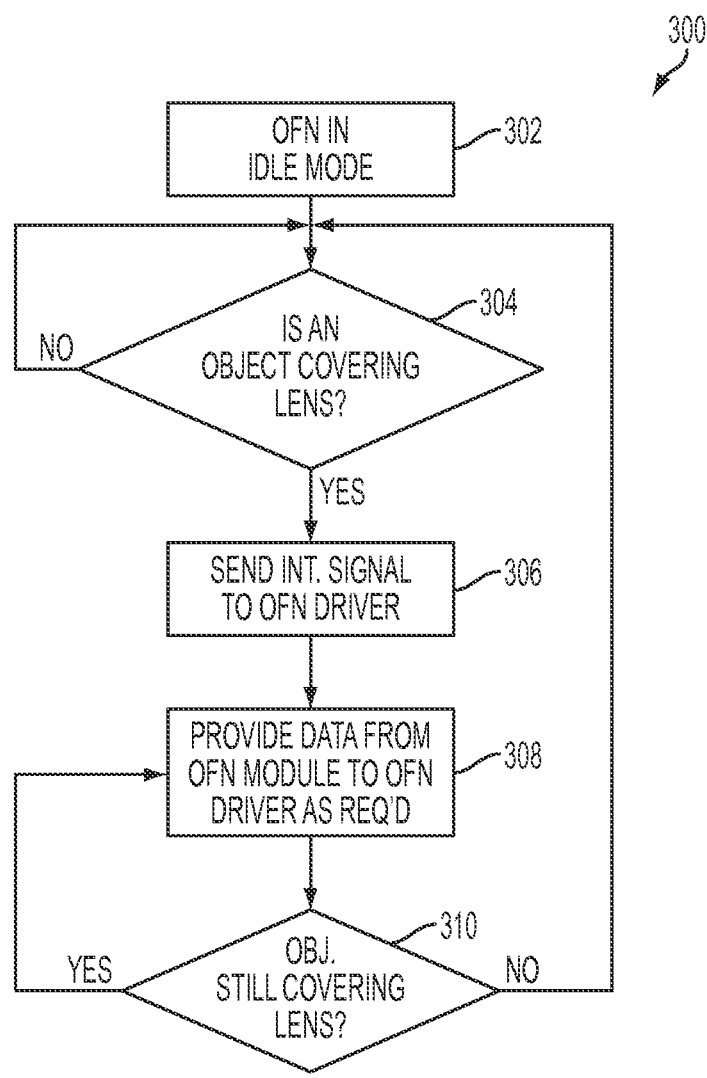
FIG. 13 illustrates a flow chart of a method for operating an optical finger navigation device according to an exemplary embodiment.

According to one exemplary embodiment wherein the optical control pad 702 is an OFN module 800 (hardware, including a lens 802) connected to an OFN driver 804 (software), as generally shown in FIG. 8, the operation can be as follows, and is illustrated by a flow chart of method 300, as shown in FIG. 13 according to an exemplary embodiment. From idle, in step 302, the OFN module 800 polls itself periodically to determine if an object, e.g., a finger, is covering its lens 802 in decision step 304. If a finger covers the lens 802 ("Yes" path from decision step 304), the OFN module 800 asserts an interrupt signal toward the OFN driver 804 (step 306). Once this interrupt signal is received, the OFN software driver 804 periodically reads data from the OFN module 800 (step 308) until the finger or other object is removed from the lens 802 (determined by decision step 310). This data indicates in which direction the finger moved while covering the lens 802. Once the finger or other object is removed (detected in the polling loop; "No" path from decision step 310), the OFN module 800 and OFN driver 804 return to the interrupt-driven mode (i.e., to decision step 304).

If the OFN driver 804 is in scroll mode, or alternatively 3D pointing mode and based on a mode control input 806, then all of the up or down motion read from the OFN module 800 is reported by the OFN driver 804 as scroll motion 808 toward an application. Left and right motion is ignored according to this exemplary embodiment, where horizontal scrolling is not supported, but could, according to another exemplary embodiment, also be reported as scrolling motion if horizontal scrolling on a user interface was a supported navigation. The OFN module 800 can be configured by the OFN driver 804 to produce the desired output for scroll (in terms of sensitivity, acceleration, hysteresis, etc.). Thus, for example, the OFN module 800 may have different hardware and/or software configurations for scroll mode versus UDLR mode according to one exemplary embodiment, e.g., different ballistics or quantization configurations. Alternatively, such OFN configurations may be the same for scroll mode and UDLR mode.

Figure 12:
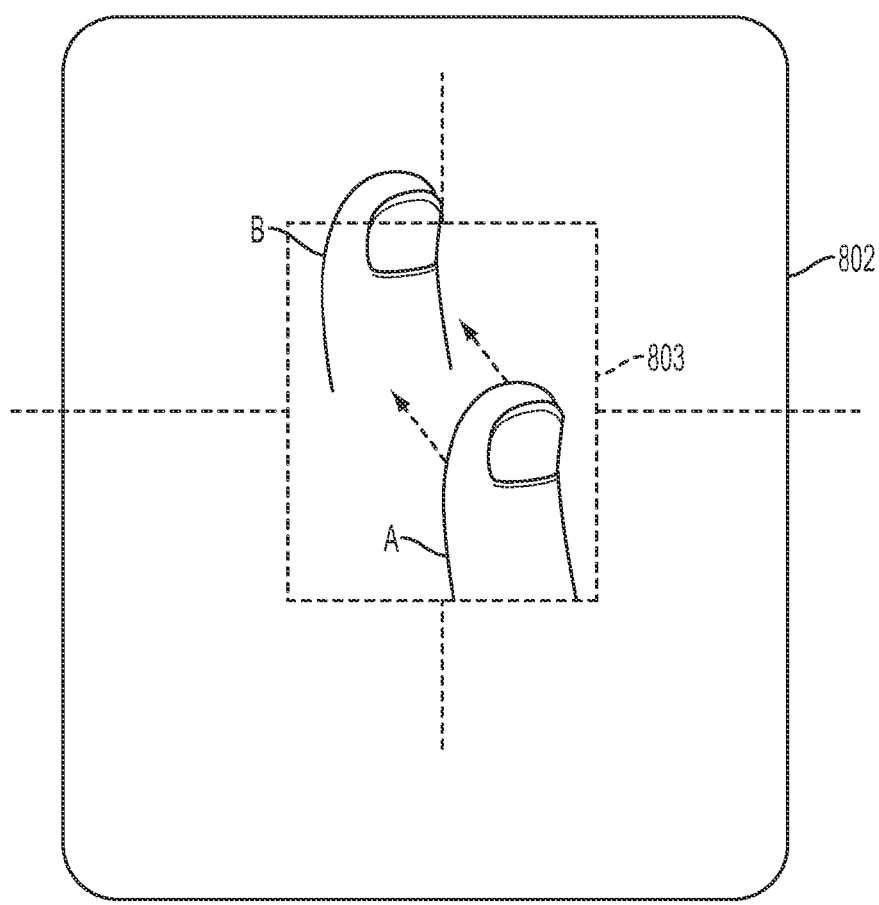
FIG. 12 illustrates an imaginary threshold for use with a lens on the optical finger navigation pad shown in FIG. 7 according to an exemplary embodiment.

If the OFN driver 804 is instead in UDLR mode, i.e., based on a mode control input 806, then the OFN driver 804 accumulates motion in all directions until an optical lens threshold (threshold) 803 is exceeded in one of the four directions. This threshold 803 can be conceptually envisioned as a virtual box surrounding a center point on the OFN lens. When the moved object exits the virtual box (threshold 803) on any side of the box, then a corresponding UDLR output is generated. Thus, for example, once the threshold 803 is exceeded, the OFN driver 804 sends, according to one exemplary embodiment, a keyboard press as an output 808 indicating in which direction the finger was moved, i.e., an up, down, left or right command which corresponds to the direction in which the finger was moved. Until the user removes his finger from the OFN module 800, no other keystrokes are reported according to this exemplary embodiment. For example as seen in FIG. 12, a user's thumb begins at position A, then is moved from position A to position B. At position B, the user's thumb has exceeded the upper part of threshold 803, indicating an "up" command, even though the user's thumb also moved from right to left, but did not exceed either of the left or right sides of threshold 803. Using a device 700 according to this exemplary embodiment, it is expected that users will flick or swipe their fingers across the OFN lens 802 in a manner which rapidly and easily surpasses the distance threshold 803 to be interpreted as an UDLR command in the direction of the finger flick. According to further exemplary embodiments, other pattern recognition methods can be used to detect the up, down, left and right movement patterns, as well as more complex ones such as circles.

Thus, according to one exemplary embodiment, motion detected by the OFN module 800 in conjunction with the OFN driver 804 can be interpreted to transmit a message which is determined based on the direction of motion and the mode. As a purely illustrative exemplary embodiment, the message sent can be formatted as illustrated in the Table below.

| Action | Scroll Mode | OFN Mode |
| --- | --- | --- |
| Move Up | 0x2, 0x8, 0x4, 0x0, 0x0, 0x0, 0x0, N | 0x4, 0x7, 0x4, 0x0, 0x0, 0x0, 0x52 |
| Move Down | 0x2, 0x8, 0x4, 0x0, 0x0, 0x0, 0x0, M | 0x4, 0x7, 0x4, 0x0, 0x0, 0x0, 0x51 |
| Move Left | no message sent | 0x4, 0x7, 0x4, 0x0, 0x0, 0x0, 0x50 |
| Move Right | no message sent | 0x4, 0x7, 0x0, 0x0, 0x0, 0x0, 0x4F |

The purely illustrative messages listed in the table above represent raw hexadecimal bytes sent over a USB link between, e.g., the 3D pointing device and system controller in Human Interface Device (HID) packets, including vendor specific bytes. Thus it will be appreciated by those skilled in the art that these messages are purely illustrative in the sense that other messages or message formats can be used. In this example, the direction of "up" is the direction facing away from the user when the user holds the handheld device, as shown by the axes in FIG. 7. Hexadecimal (base 16, digits 0-F) numbers are typically indicated by the prefix "0x". In hexadecimal 2's complement numbers, 0x1 to 0x7F are positive numbers (decimal 1 to 127). 0xFF to 0x80 are negative numbers (decimal −1 to −128). In the table above, let "N" equal a positive number of this type and let "M" equal a negative number of this type.

In the afore-described exemplary embodiment, only one UDLR command is generated per detected motion of an object across the OFN lens 804. However, according to another embodiment, it may be possible to detect and generate multiple UDLR commands per motion, i.e., without requiring the user to lift his or her finger from the lens. Such an embodiment should consider, however, potential design challenges. For example, if there is sufficient user interface delay associated with updating the displayed position of a cursor or focus condition, this may cause accidental overshoot of a selection object (target) on the user interface which is being interacted with via UDLR commands, e.g., displayed on a television, since the user might interpret the delay as a failure to exceed the above-described distance threshold and would instead send a second, repetitive UDLR command.

According to a further exemplary embodiment, the size of threshold 803 is variable. Threshold 803 can vary in size in accordance with a size setting determined by a user, or the size of threshold 803 can be set to a size of an interface screen of screen elements. Further, according to further exemplary embodiments, a sensitivity to the size of a user's finger can be varied, such that OFN driver would recognize a first user's finger versus that of another. In addition, a stylus or other type of pointer device can be used in place of a user's finger to indicate motion on lens 802. According to further exemplary embodiments, if motion by a user's finger (or other device) in a first direction is determined by OFN driver 804, the rate motion in the same direction can be determined in accordance with rate that the user's finger or device moves on the lens 802. For example, referring to FIG. 12, if at time $t_0$ a user's finger is at position A and moves to position B, from the difference in time between $t_0$ to $t_1$ will directly or substantially correlate to a rate of motion of the cursor as driven by OFN driver 804. The same rate of motion applies, as those of skill in the art can appreciate, to downward movements, or leftward and rightward movements or swipes.

Changing a 3D pointing device between scroll mode and UDLR mode can be accomplished in any desired way. According to one exemplary embodiment, the OFN driver 804 changes between scroll and UDLR mode depending on whether 3D pointing is enabled or not, respectively. That is, if device 700 has 3D pointing enabled, then mode control input 806 places the OFN driver 804 into scroll mode. Alternatively, if 3D pointing is disabled, then mode control input 806 places the OFN driver 804 into UDLR mode. Enabling 3D pointing on device 700 can, for example, involve pressing a button disposed on the device itself, or any other desired mechanism can be used to switch modes. However, other embodiments may not tie scroll/UDLR mode switching to 3D pointing, and any desired mechanism can be used to toggle mode control input 806.

Figure 9:
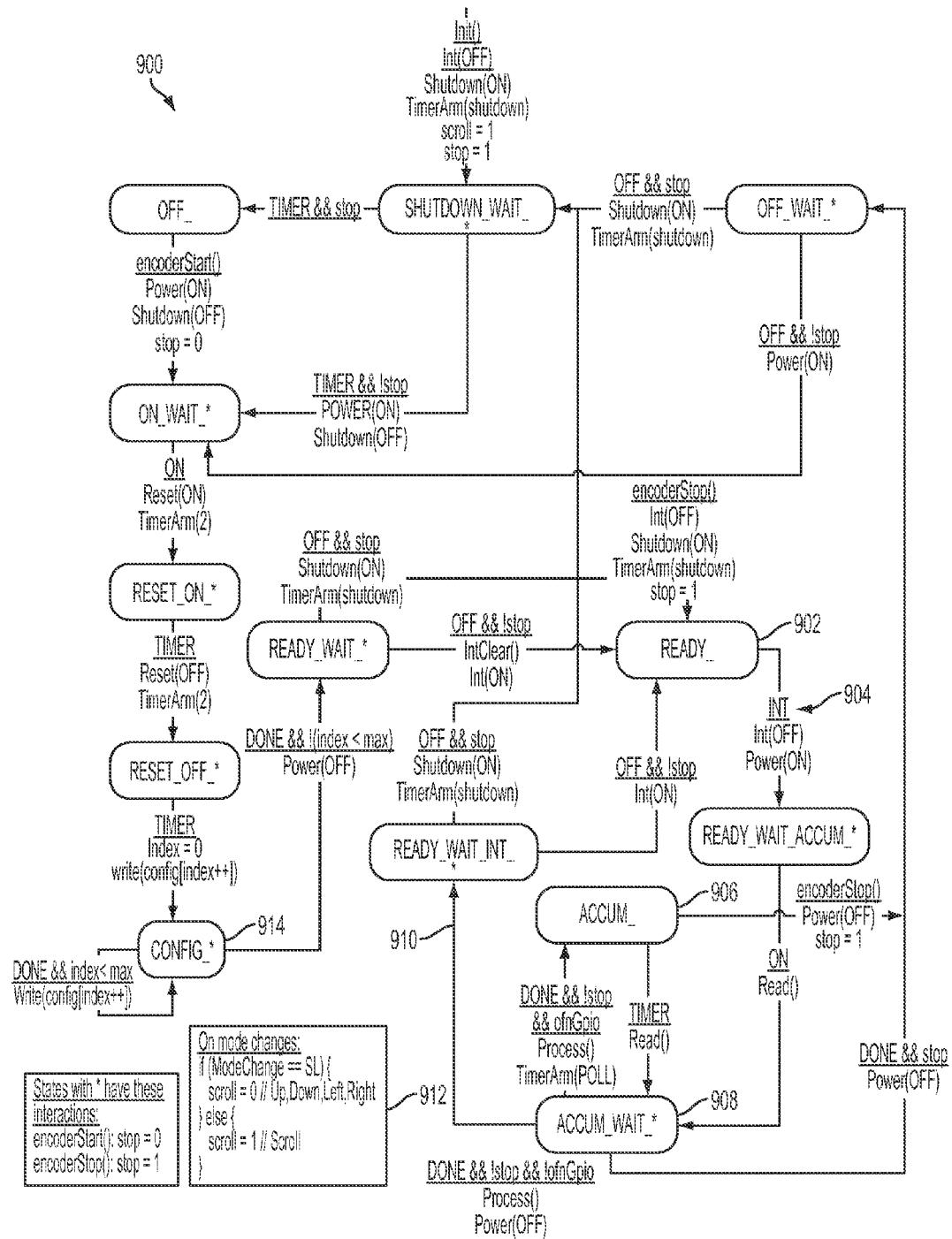
FIG. 9 is a state machine associated with an optical finger navigation (OFN) device which can operate as a scroll/UDLR control element according to an exemplary embodiment.

An exemplary state machine 900 for the OFN driver 804 is presented in FIG. 9. The core operating sequence begins with READY_state 902. From that state, OFN driver 804 polls the 3D pointer device 700 periodically to see if a finger is covering lens 802. If a finger covers lens 802, it informs OFN driver 804 by asserting the interrupt signal INT 904. Once the INT signal is received, OFN driver 804 periodically reads data from 3D pointer device 700 until the finger is removed by toggling between the ACCUM_WAIT_* state 908 and ACCUM_state 906. Once the finger is removed, transition 910 occurs and OFN driver 804 returns to READY state 902 (unless the operation is being turned off, in which case it returns to SHUTDOWN_WAIT_state).

Therein, the key action functions and signals referenced in state machine 900 are listed below:
encoderStart( )—The system tells the OFN driver to start producing outputs.
encoderStop( )—The system tells the OFN driver to stop producing outputs and to go into a low power mode.
TimerArm(*)—Arm a timer that will alert the OFN driver when it expires.
TIMER—A signal that indicates that the timer armed by TimerArm( ) has expired.
Power(*)—OFN driver 804 is requesting a power level from the system, i.e., either ON or OFF.
ON/OFF—Responses from the system telling the driver that it has been granted an ON or OFF power level in response to the POWER(*) request.
Shutdown(*)—Enable or disable the shutdown signal to the OFN device.
Reset(*)—Enable or disable the reset signal to the OFN device.
Write(*)—Write the specified data to the OFN device.
Read( )—Read the sensor measurements from the OFN device.
DONE—A signal that a Write( ) or Read( ) has been completed.

The Process( ) function performs the high level functions of interpreting the OFN device data as either a scrolling input or UDLR input depending on the operational mode selected (described in more detail below) or as noise to be ignored. It will be appreciated by those skilled in the art that the state machine of FIG. 9 is purely illustrative and that other logic can be used to implement the more general UDLR/scroll mode switching described herein.

The illustrative OFN driver 900 includes a mode switch 912 that switches between a scroll mode and a UDLR mode. Depending on whether the system requests scrolling or not via the "SL" signal, OFN driver 804 either processes finger movements on the OFN lens 802 as scrolling commands or as UDLR commands.

If OFN driver 804 is in scroll mode, all up-or-down motion read from OFN lens 802 is reported as scroll motion. Left and right motion, according to an exemplary embodiment, is either ignored or used for horizontal scroll instead of vertical scroll. OFN module 800 is configured by OFN driver 804 in, for example, CONFIG_* state 914, for the various parameters appropriate for either scrolling or UDLR operation, such as sensitivity, acceleration, hysteresis, among others.

If OFN driver 804 is in UDLR mode, it accumulates motion in all directions until a threshold is exceeded in one of the 4 directions. According to a further exemplary embodiment, there can be more directions, such as "in" and "out," if desired. Once one of the thresholds is exceeded, driver 804 sends the appropriate command indicating which direction the finger was moved—either Up, Down, Left or Right for the 4 direction case. In a further exemplary embodiment, until the user removes his finger from OFN lens 802, no other commands are reported. The exemplary embodiments of OFN driver 804 described herein therefore offer several important advantages:

1. Guards against target overshoot by the user falsely interpreting user interface delay as inadequate motion;
2. Adjusts for the varying amounts of motion per stroke that each user assumes is required to move the cursor; and
3. Allows for precise single-click motion control of the cursor.

According to studies performed by the inventors, the typical user operation was a single flick with the finger per UDLR command—a very simple, easy and deterministic method of operation, since each flick equals a key-press or command.

Although OFN technology has been described herein, the optical control pad 702 can take any desired form and can detect movement of, e.g., a user's thumb, using any desired technology. Moreover control pad 702 need not be optical, but could be touch-sensitive or use any technology which can detect movement of a user's finger thereover to derive an input therefrom.

Figure 10:
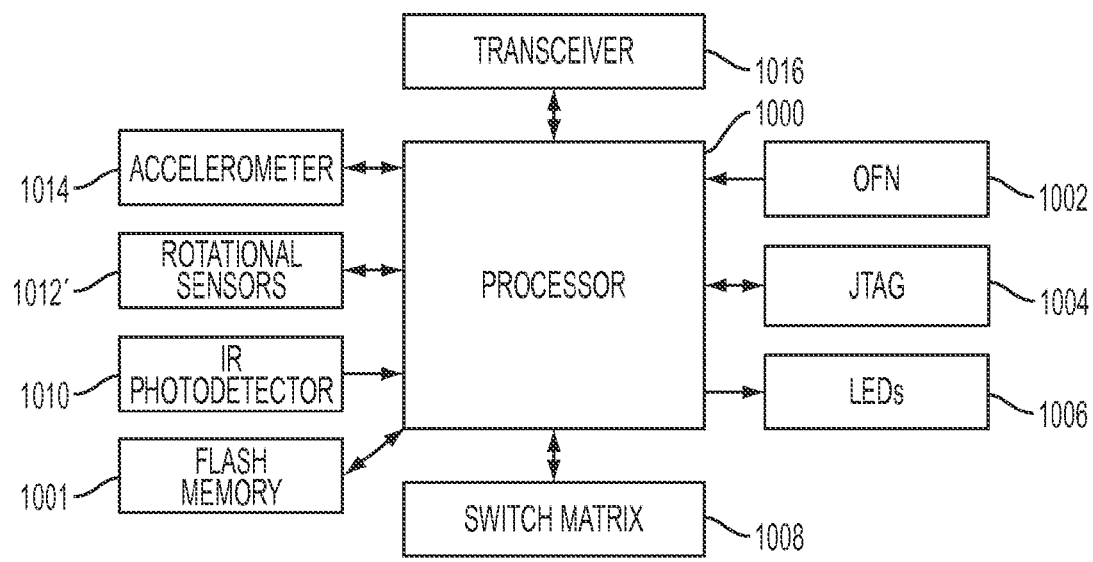
FIG. 10 depicts hardware elements associated with a 3D pointing device according to an exemplary embodiment.

Having provided a description of UDLR mode switching in exemplary 3D pointing devices according to the aforedescribed exemplary embodiments, FIG. 10 illustrates an exemplary hardware architecture associated with such 3D pointing devices. Therein, a processor 1000 communicates with other elements of the 3D pointing device including a flash memory 1001, OFN 1002, boundary scan cells (joint test action group) (JTAG) 1004, light emitting diodes (LEDs) 1006, switch matrix 1008, infra-red (IR) photo detector 1010, rotational sensor(s) 1012, accelerometer 1014 and transceiver 1016. The flash memory device 1001 can be used by processor 1000 to store various programs and/or data for use in operating the 3D pointing device, e.g., bias estimates, as described above. The OFN 1002 is an input component which enables a user to provide either UDLR or scroll input to the interface as described above. JTAG 1004 provides the programming and debugging interface to the processor. LEDs 1006 provide visual feedback to a user, for example, when a button is pressed. Switch matrix 1008 receives inputs, e.g., indications that a button on the 3D pointing device has been depressed or released, that are then passed on to processor 1000. The optional IR photo detector 1010 can be provided to enable the exemplary 3D pointing device to learn IR codes from other remote controls. Rotational sensors 1012 provide readings to processor 1000 regarding, e.g., the y-axis and z-axis rotation (angular rate) of the 3D pointing device as described above. Accelerometer 1014 provides readings to processor 1000 regarding the linear acceleration of the 3D pointing device which can be used, e.g., to perform tilt compensation and to compensate for errors which linear acceleration introduces into the rotational readings generated by rotational sensor(s) 1012. Transceiver 1016 is used to communicate information to and from 3D pointing device, e.g., to the system controller 228 or to a processor associated with a computer. The transceiver 1016 can be a wireless transceiver, e.g., operating in accordance with the Bluetooth standards for short-range wireless communication or an infrared transceiver. Alternatively, 3D pointing device according to these exemplary embodiments can communicate with systems via a wireline connection.

Figure 11A:
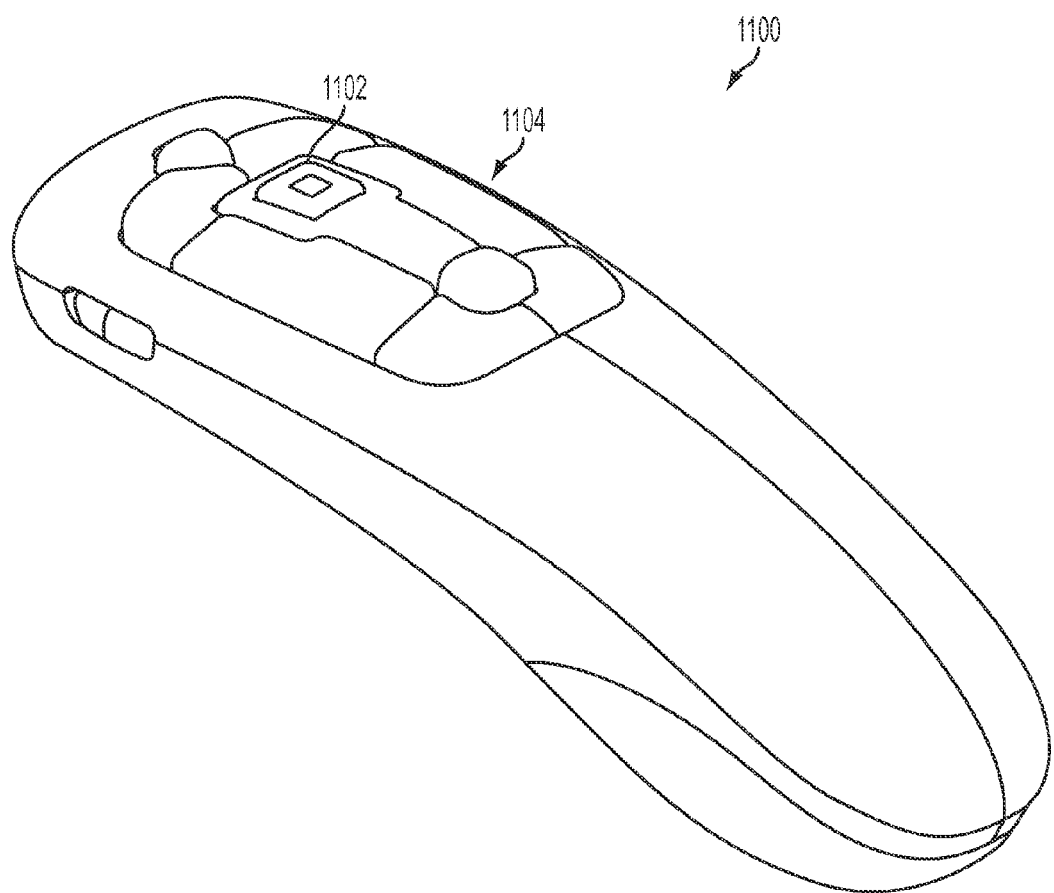
FIGS. 11(a)-11(c) show various views of another 3D pointing device including an OFN according to an exemplary embodiment.
Figure 11B:
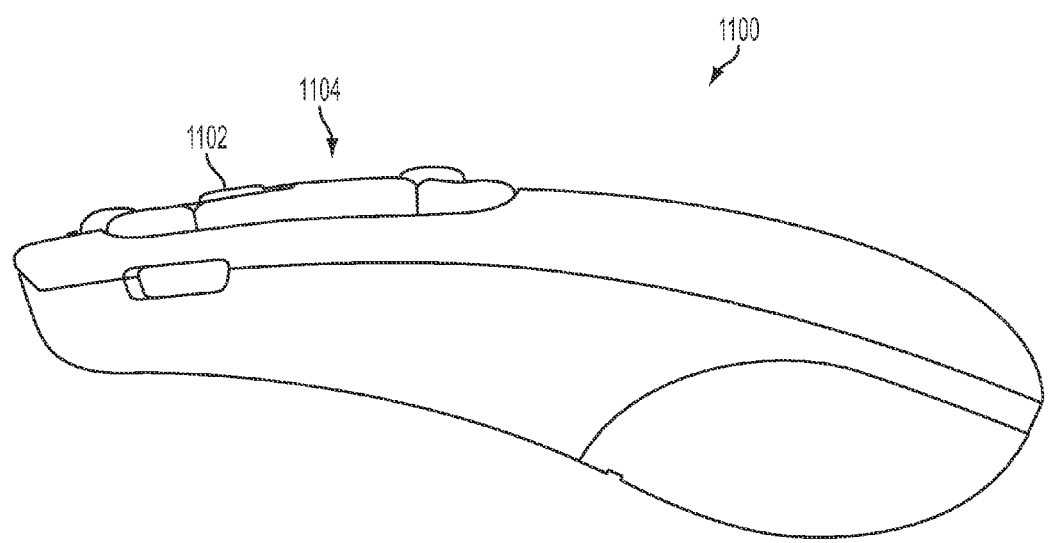
Figure 11C:
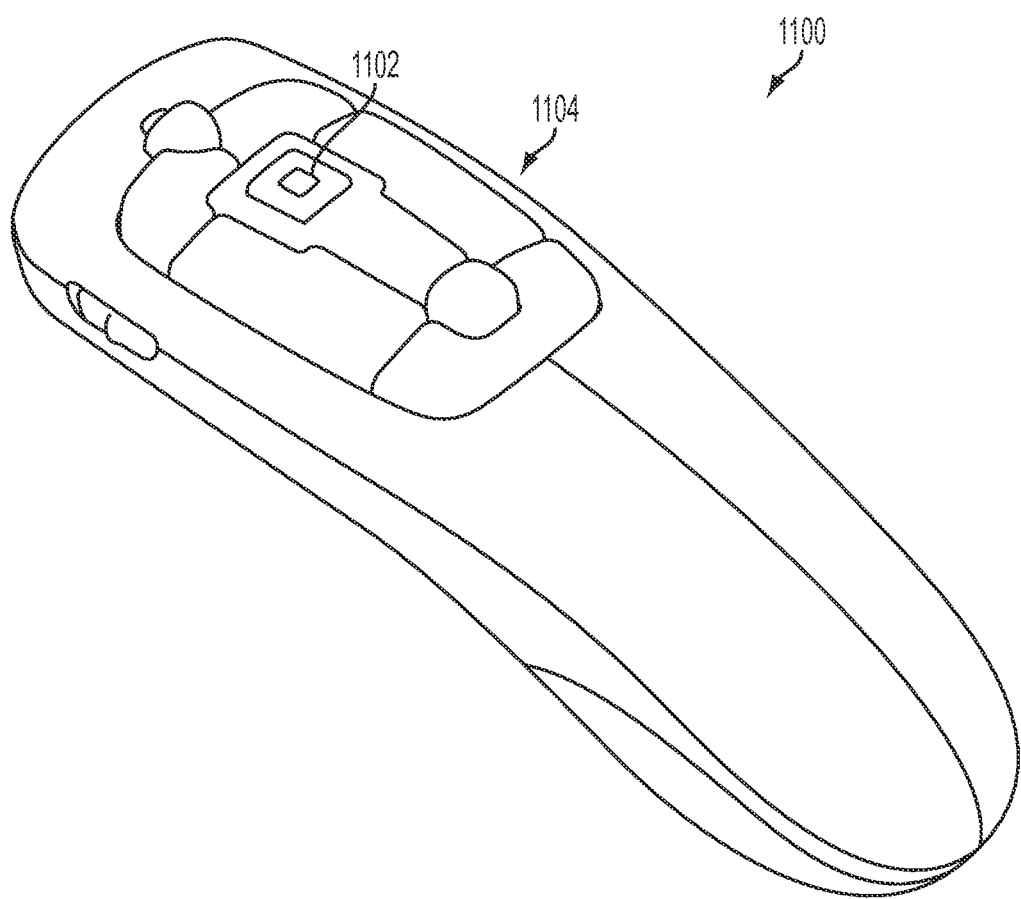

FIGS. 11(a)-11(c) illustrate various views of another 3D handheld device (pointing device) 1100, e.g., a 3D pointing device, according to an exemplary embodiment. Therein, an OFN 1102 is explicitly illustrated proximate the center of the control area 1104. Those skilled in the art will appreciate that other industrial designs including OFNs and scroll/UDLR mode switching are contemplated by these exemplary embodiments. According to still a further exemplary embodiment, when either of 3D pointing devices 700, 1100 are in scrolling mode, or 3D mode, scrolling of a cursor can occur by one or more, or a series, of hand gestures. For example, a series of hand rolling movements, or a series of quick and closely spaced in time up-and-then-down motions can move the cursor up, while a series of quick and closely spaced in time down-and-then-up motions can move the cursor down. Those of skill in the art can appreciate that many such hand gestures or movements are possible to incorporate a scrolling mode, and the above discussed example, are not meant to be taken in a limiting manner.

The remote or 3D pointing device can take any desired form, and UDLR mode switching according to exemplary embodiments is not limited thereto but can be provided in any device which interacts with applications that may operate in a UDLR mode or a non-UDLR mode, including, e.g., a mobile phone.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within the device, e.g., a 3D pointing device or other device, which contains the sensors or the software may run on a processor or computer housed within another device, e.g., a system controller, a game console, a personal computer, etc., which is in communication with the device containing the sensors. In such a case, data may be transferred via wireline or wirelessly between the device containing the sensors and the device containing the processor which runs the software which performs the bias estimation and compensation as described above. According to other exemplary embodiments, some of the processing described above with respect to UDLR/scroll mode switching may be performed in the device containing the sensors, while the remainder of the processing is performed in a second device after receipt of the partially processed data from the device containing the sensors.

Although the foregoing exemplary embodiments relate to sensing packages including one or more rotational sensors and an accelerometer, bias estimation techniques according to these exemplary embodiments are not limited to only these types of sensors. Instead bias estimation techniques as described herein can be applied to devices which include, for example, only accelerometer(s), optical and inertial sensors (e.g., a rotational sensor, a gyroscope or an accelerometer), a magnetometer and an inertial sensor (e.g., a rotational sensor, a gyroscope or an accelerometer), a magnetometer and an optical sensor, or other sensor combinations. Additionally, although exemplary embodiments described herein relate to bias estimation in the context of 3D pointing devices and applications, such techniques are not so limited and may be employed in methods and devices associated with other applications, e.g., mobile phones, medical applications, gaming, cameras, military applications, etc.

Moreover, the exemplary processing described herein may be performed, in whole or in part, either within the 3D pointing device itself or outside of the 3D pointing device. For example, raw sensor data can be transmitted to a system processor, e.g., within a set-top box or a computer, wherein it can then be processed to e.g., to update cursor position associated with a cursor displayed on a user interface screen.

The above-described exemplary embodiments are intended to be illustrative in all respects, rather than restrictive, of the present invention. Thus the present invention is capable of many variations in detailed implementation that can be derived from the description contained herein by a person skilled in the art. For example, although the foregoing exemplary embodiments describe, among other things, the use of inertial sensors to detect movement of a device, other types of sensors (e.g., ultrasound, magnetic or optical) can be used instead of, or in addition to, inertial sensors in conjunction with the afore-described signal processing. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A remote control device comprising:
an optical finger navigation (OFN) module configured to detect movement of an object across a surface of said OFN module and to generate data associated with said detected movement; and
a processor configured to receive said data and to transmit a command based on said data, wherein said processor is configured to operate either in a scroll mode or an up-down-left-right (UDLR) mode such that when in said scroll mode said processor generates a scroll command based on said data and when in said UDLR mode said processor generates a UDLR command based on said data.

2. The remote control device of claim 1, wherein only one UDLR command is generated per detected motion across the surface of the OFN module.

3. The remote control device of claim 1, wherein only multiple UDLR commands are generated per detected motion across the surface of the OFN module.

4. The remote control device of claim 1, wherein at least one of the OFN module and the processor is further configured to accumulate the detected movement of the object across the surface until the accumulated, detected motion exceeds a threshold.

5. The remote control device of claim 4, wherein the threshold is a virtual box defined on the surface.

6. The remote control device of claim 4, wherein the threshold is variable.

7. The remote control device of claim 6, wherein the threshold is settable by a user of the remote control device.

8. The remote control device of claim 6, wherein the threshold is settable in response to a detected size of a user's finger.

9. The remote control device of claim 1, wherein the remote control device is a 3D pointing device including at least one motion sensor for detecting motion of the remote control device.

10. A system that includes a 3D pointing device for controlling a user interface, comprising:
a processor configured to switch an operating mode of the 3D pointing device between a random access mode and a non-random access mode,
wherein the processor is further configured to interpret some outputs from said 3D pointing device as random access outputs after switching to said non-random access mode,
wherein the processor is further configured to interpret motion of said 3D pointing device as a random access output after switching to said non-random access mode, and
wherein the processor is further configured to interpret an input via an optical touchpad or optical finger navigation element disposed on said 3D pointing device as a non-random access output after switching to said non-random access mode.

11. The system of claim 10, wherein while in said random access mode, the processor is further configured such that control of said user interface can involve pointing to any location on a display and while in said non-random access mode control of said user interface can only involve accessing predetermined display locations.

12. The system of claim 10, further comprising:
a control element, wherein when said 3D pointing device is in said random access mode, the processor is configured to interpret an output of said control element disposed on said 3D pointing device as a scroll command; and
when said 3D pointing device is in said non-random access mode, the processor is further configured to interpret said output of said control element as an up-down-left-right (UDLR) command.

13. The system of claim 10, wherein the switching of said operating mode is performed by said 3D pointing device.

14. The system of claim 10, wherein the switching of said operating mode is performed by a system controller in communication with said 3D pointing device.

15. The system of claim 10, wherein the switching of said operating mode is performed by an application which is receiving inputs from said 3D pointing device.

16. The system of claim 12, wherein said interpreting is performed by one of a system controller, the user interface or an application after receipt of corresponding data from the 3D pointing device.

17. A method for controlling a user interface that interfaces with a remote control device using a single control element of the remote control device, the method comprising:
determining, by the user interface, whether the remote control device should be operating in a first mode or a second mode;
forwarding, by the user interface, a control signal to the remote control device to put the remote control device in either the first operating mode or the second operating mode; and
receiving, by the user interface, either a scroll command that corresponds to the first operating mode, or an up-down-left-right (UDLR) command that corresponds to the second operating mode.

18. The method of claim 17, wherein the step of receiving the scroll command or the UDLR command comprises:
detecting movement of an object across a surface of said single control element of said remote control device;
generating, when in the scroll mode, the scroll command responsive to said detected movement; and
generating, when in the UDLR mode, the UDLR command.

19. A system for controlling operation of a content providing apparatus, comprising:
a remote control device, the remote control device including
a housing;
at least two sensors, disposed at least partially within said housing, said first of the at least two sensors configured to detect motion of said remote control device in a first plane of motion, and to generate first data associated with said detected motion in the first plane of motion, and wherein said second of the at least two sensors is configured to detect motion of said remote control device in a second plane or motion, and to generate second data associated with said detected motion in the second plane of motion;
an optical finger navigation (OFN) module, disposed on a first surface of said housing, configured to detect movement of an object across a surface of a lens and to generate third data associated with said detected movement, and further wherein the detected motion includes information about a direction of the detected motion, and still further wherein the detected motion includes information about the detected motion exceeding a predetermined threshold;
a user input control element configured to switch said remote control device from a 3D pointing mode into a non-3D pointing mode; and
a processor configured to receive said first data, said second data, and said third data, and is further configured to operate, when in said 3D pointing mode, to transmit 3D pointing information associated with said first and second data,
and further configured to operate, when in said non-3D pointing mode, to transmit UDLR information associated with said third data; and wherein the system further includes
a user interface controlling device configured to generate and control a user interface based, at least in part, on received user inputs,
wherein said user interface controlling device is further configured to receive said 3D pointing information from the remote control device that is interpreted as a scroll command, and which is further configured to receive said non-3D pointing information from the remote control device that is interpreted as an up-down-left-right (UDLR) command.

* * * * *